(12) United States Patent
Miyamoto

(10) Patent No.: US 7,638,905 B2
(45) Date of Patent: Dec. 29, 2009

(54) VOLTAGE FOR LCD

(75) Inventor: Hitoshi Miyamoto, Osaka (JP)

(73) Assignee: Funai Electric Co., Ltd., Dalto-shi, Osaka (JP)

( * ) Notice: Subject to any disclaimer, the term of this patent is extended or adjusted under 35 U.S.C. 154(b) by 183 days.

(21) Appl. No.: 11/827,253

(22) Filed: Jul. 11, 2007

(65) Prior Publication Data
US 2008/0048768 A1 Feb. 28, 2008

(30) Foreign Application Priority Data
Jul. 13, 2006 (JP) ............... 2006-192992

(51) Int. Cl.
*G01R 1/20* (2006.01)
*G06F 3/038* (2006.01)

(52) U.S. Cl. ............ 307/154; 345/211; 345/212

(58) Field of Classification Search ......... 345/211, 345/212; 307/154
See application file for complete search history.

(56) References Cited

U.S. PATENT DOCUMENTS 6,967,649 B2 * 11/2005 Sun ............... 345/211

FOREIGN PATENT DOCUMENTS

| JP | 01-115380 U | 8/1989 |
|---|---|---|
| JP | 10-150723 | 6/1998 |
| JP | 2001-178021 A | 6/2001 |
| JP | 3110950 U | 5/2005 |
| JP | 3120526 U | 3/2006 |
| JP | 3120526 U | 3/2006 |

OTHER PUBLICATIONS

Japanese Notice of the reason for refusal, dated Jun. 25, 2008.

* cited by examiner

*Primary Examiner*—Shawn Riley
(74) *Attorney, Agent, or Firm*—Yokoi & Co., U.S.A., Inc.; Peter Ganjian

(57) ABSTRACT

A circuit that can avoid drops in power supply and heat generation and save on manufacturing costs with no need of external controls are configured such that: a switching transformer has a terminal that produces an output of 22V at power-on and an output of 8V during standby and a terminal that produces an output of 10V at power-on and an output of 3V during standby; the output of 22V or 8V is lowered to 5V by a regulator IC1 and applied (input) to a regulator IC2; an input of 10V or 3V is produced at the regulator IC2; at power-on, the regulator IC2 lowers 10V to 3.3V and supplies the lowered 3.3V to the inverter circuit 10f; and during standby, a regulator IC lowers 8V to 3.3V and supplies the lowered 3.3V to the inverter circuit 10f.

5 Claims, 4 Drawing Sheets

US 7,638,905 B2

VOLTAGE FOR LCD

CROSS-REFERENCES TO RELATED APPLICATIONS

The present application is related to the Japanese Patent Application No. 2006-192992, filed Jul. 13, 2006, the entire disclosure of which is expressly incorporated by reference herein.

BACKGROUND OF THE INVENTION

1. Field of the Invention

The present invention relates to a circuit, and more specifically relates to a circuit that supplies a voltage outputted from a switching transformer to a target device and a circuit that stabilizes voltage supply to an inverter circuit of an LCD apparatus.

2. Description of the Related Art

Conventionally, if there is a possibility that a voltage to be supplied to a predetermined device will drop, power voltage supply is stabilized by switching among a plurality of power voltage supply lines with a transistor each time a supply voltage drops (as disclosed in Japanese Utility Model Registration Application No. 3110950), or by controlling the on/off of a regulator IC with a microcomputer according to the timing at which supply voltage is switched (as disclosed in Japanese Utility Model Registration Application No. 3120526).

Also known is a technology wherein two lines of power supply are provided and normally power is supplied directly from one of the lines, and when this line causes a drop in power supply or when a large amount of power supply is required, power is supplied, due to a Zener breakdown, from the other line that is connected through a Zener diode connected in reverse direction (as disclosed in Japanese Unexamined Patent Application Publication No. 1998-150723 and Japanese Unexamined Utility Model Registration Application Publication No. 1989-115380).

With the switching power supply lines as described in the Japanese Utility Model Registration Application Nos. 3110950 and 3120526, there were problems such as drops in power supply or difficulty in controlling the timing of line switching. Although it is possible to control the timing for predicted switching as in power on or standby, it is impossible to cope with unexpected power supply drops and the like. Furthermore, to implement the switching it is necessary to add a switching device such as a transistor, which inevitably increases the manufacturing cost.

Also, with the technology of using a regulator as described in the Japanese Unexamined Patent Application Publication No. 1998-150723 and the Japanese Utility Model Registration Application No. 3120526, a large amount of heat is generated and therefore a heat sink or the like must be provided to dispose of unwanted heat. This is disadvantageous in designing the circuit and also the electric power consumed for heat generation is wasted. This heat generation problem also exists in the case of using a Zener diode as described in the Japanese Utility Model Registration Application No. 3120526.

BRIEF SUMMARY OF THE INVENTION

The present invention aims at providing a circuit for target device or an inverter circuit that can avoid power supply drops and heat generation and save on manufacturing costs with no need of external controls (by a microcomputer etc.).

The present invention discloses a circuit that stabilizes voltage supply to an inverter circuit of an LCD apparatus, comprising: a switching transformer including a first output terminal and a second output terminal that is contained in a power supply circuit, with the first output terminal and the second output terminal respectively outputting a first voltage and a second voltage; a first diode having an anode connected to the first output terminal; a first regulator integrated circuit (IC) having an input terminal that is connected to a cathode of the first diode; a second diode having an anode connected to an output terminal of the first regulator IC; a second regulator integrated circuit (IC) having an input terminal that is connected to a cathode of the second regulator IC; a third diode having a cathode connected to the input terminal of the second regulator IC; a fourth diode having an anode connected to the second output terminal and a cathode connected to an anode of the third diode; from said first output terminal the first voltage is output that is used for feedback control of said switching transformer, from said second output terminal the second voltage is output that is lower than said first voltage, said first regulator integrated circuit lowers said first voltage to a third voltage that is lower than said second voltage and inputs said third voltage to said second regulator integrated circuit, and from said second output terminal said second voltage is input to said second regulator integrated circuit through a backflow prevention diode; at power-on of said LCD apparatus, said second voltage is input to said second regulator IC, and said second voltage is lowered to a fourth voltage that is lower than said third voltage and supplied to said inverter circuit; and during standby of said LCD apparatus, when said second voltage drops below said third voltage due to a drop in the voltage supplied from said first output terminal and said second output terminal compared with a voltage at said power-on, said third voltage is input to said second regulator integrated circuit and lowered to a fourth voltage that is lower that said third voltage and then supplied to said inverter circuit.

One aspect of the present invention provides a circuit that supplies a voltage outputted from a switching transformer to a target device, comprising: the switching transformer including a first terminal and a second terminal that respectively output a first voltage and a second voltage with the second voltage lower than the first voltage, a first constant voltage circuit for inputting the first voltage from the first terminal of the switching transformer and outputting a third voltage that is lower than the first voltage; a diode having an anode for inputting the second voltage from the second terminal of the switching transformer; a second constant voltage circuit for inputting the second voltage from a cathode of the diode, inputting the third voltage from the first constant voltage circuit, generating a fourth voltage that is lower than the third voltage by reducing the second voltage, generating the fourth voltage by reducing the third voltage when an output of the second voltage drops below the third voltage and supplying the fourth voltage to the target device.

That is, the first voltage outputted form the switching transformer is reduced to the third voltage by the first constant voltage circuit and inputted to the second constant voltage circuit, and likewise the second voltage outputted from the switching transformer is inputted to the second constant voltage circuit, and the higher of the third and second voltages is inputted to the second constant voltage circuit. The second constant circuit reduces an inputted voltage to the fourth voltage to supply to the target device.

This configuration is preferable when the output of the switching transformer drops. Specifically, although normal relationship among respective voltages is first voltage>second voltage>third voltage>fourth voltage, when the output of the switching transformer drops it may become first voltage>third voltage>second voltage>fourth voltage. This occurs in a transient state after the output of a switching transformer was changed, when power supply to a power supply circuit is unstable, or when the entire output of a switching transformer is lowered to save electricity. In such a case, it was necessary to switch the voltage to be inputted to the second constant voltage circuit by means of a switching circuit or the like conventionally, but the configuration described above allows the voltage supply source to be switched automatically and without delay (seamlessly) without having to switch between power sources. This makes it possible to provide a circuit whereby drops in power supply and heat generation can be avoided and thereby the manufacturing cost can be reduced.

An optional aspect of the present invention provides a circuit wherein the switching transformer is feedback-controlled based on the first voltage. In this configuration, since the second voltage is normally supplied to the second regulator, there is no load on a terminal to which the first voltage for the switching transformer is supplied and there is a load only on a terminal to which the second voltage is supplied. Therefore, when the entire output of a switching transformer is reduced, a drop in the output from the terminal for the second voltage is larger than a drop in the output from the terminal for the first voltage, thus causing a transient state in which the terminal for the second voltage become temporarily unable to supply a sufficient voltage to the second constant voltage circuit. Accordingly, by supplying a voltage based on the second voltage that is lower than the first voltage to the inverter circuit under normal conditions, and using the first voltage that is higher that the second voltage only when the second voltage dropped temporarily, it is possible to save the power consumption and the heat generation in the first constant voltage circuit under normal conditions.

An optional aspect of the present invention provides a circuit wherein one of or a combination of the first constant voltage circuit and the second constant voltage circuit by means of a regulator IC. That is, if the first and second constant voltage circuits are realized using the regulator IC, the circuit configuration of a circuit is simplified, thus making it easy to design the circuit. Also, less area on the substrate is required for mounting circuit elements, which contributes to the miniaturization of electrical and electronic devices using the circuit of the present invention.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

For purposes of illustration, programs and other executable program components are illustrated herein as discrete blocks, although it is recognized that such programs and components may reside at various times in different storage components, and are executed by the data processor(s) of the computers.

Figure 1:
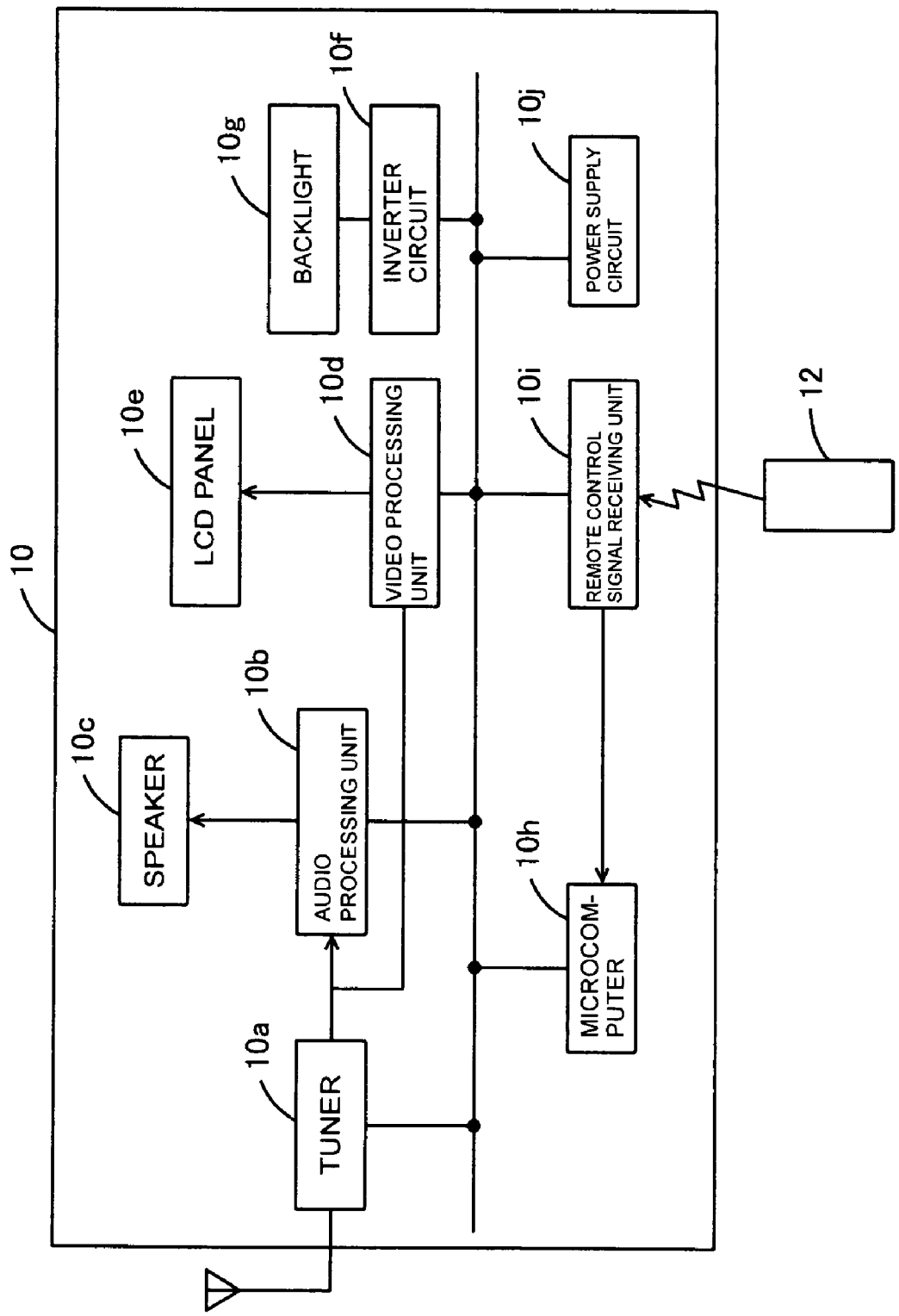
FIG. 1 is a block diagram illustrating the schematic configuration of an LCD television.
Figure 2:
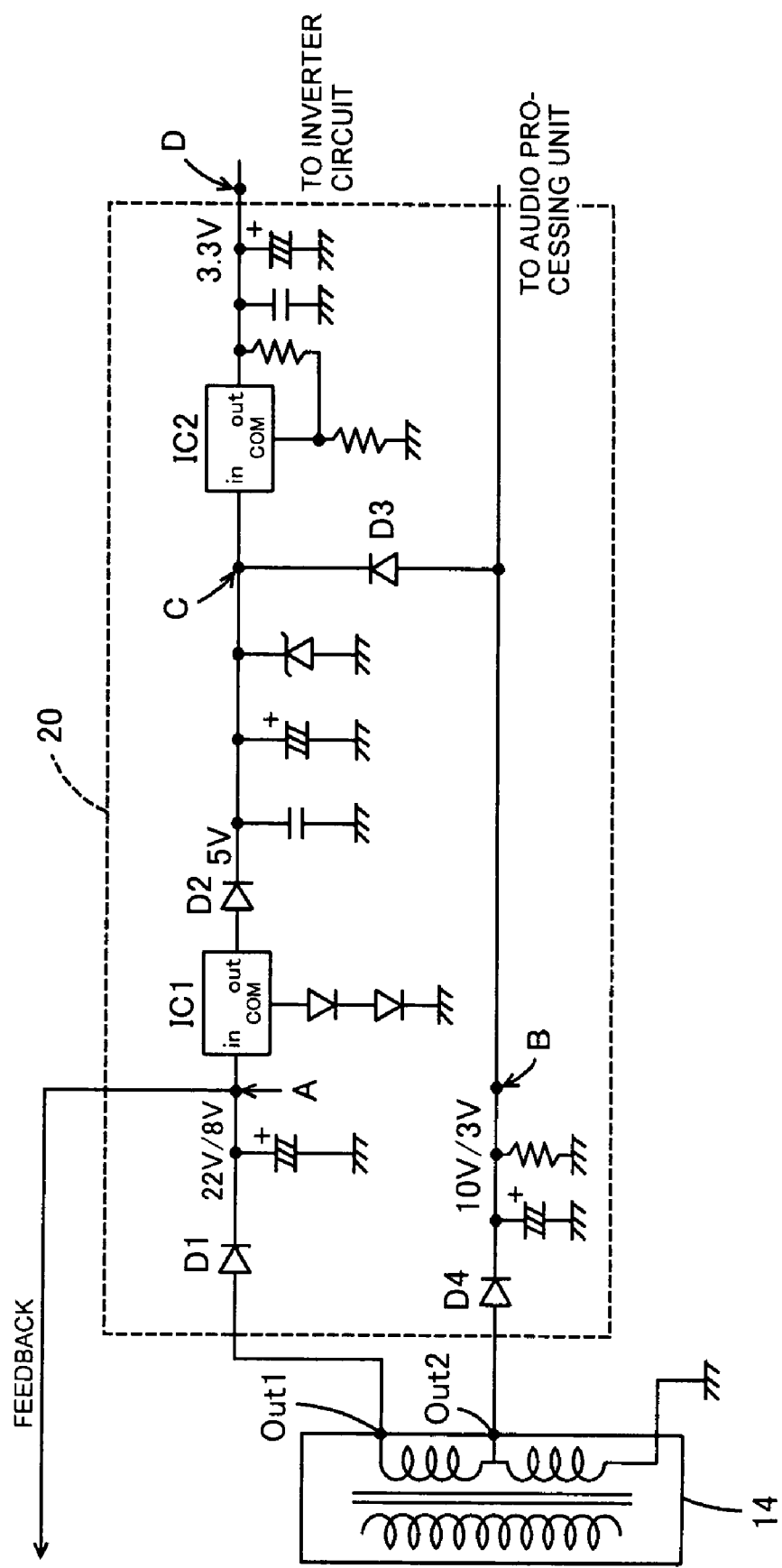
FIG. 2 is a circuit diagram showing a voltage supply stabilizing circuit to be output from a switching transformer in the power supply circuit of the LCD television.
Figure 3:
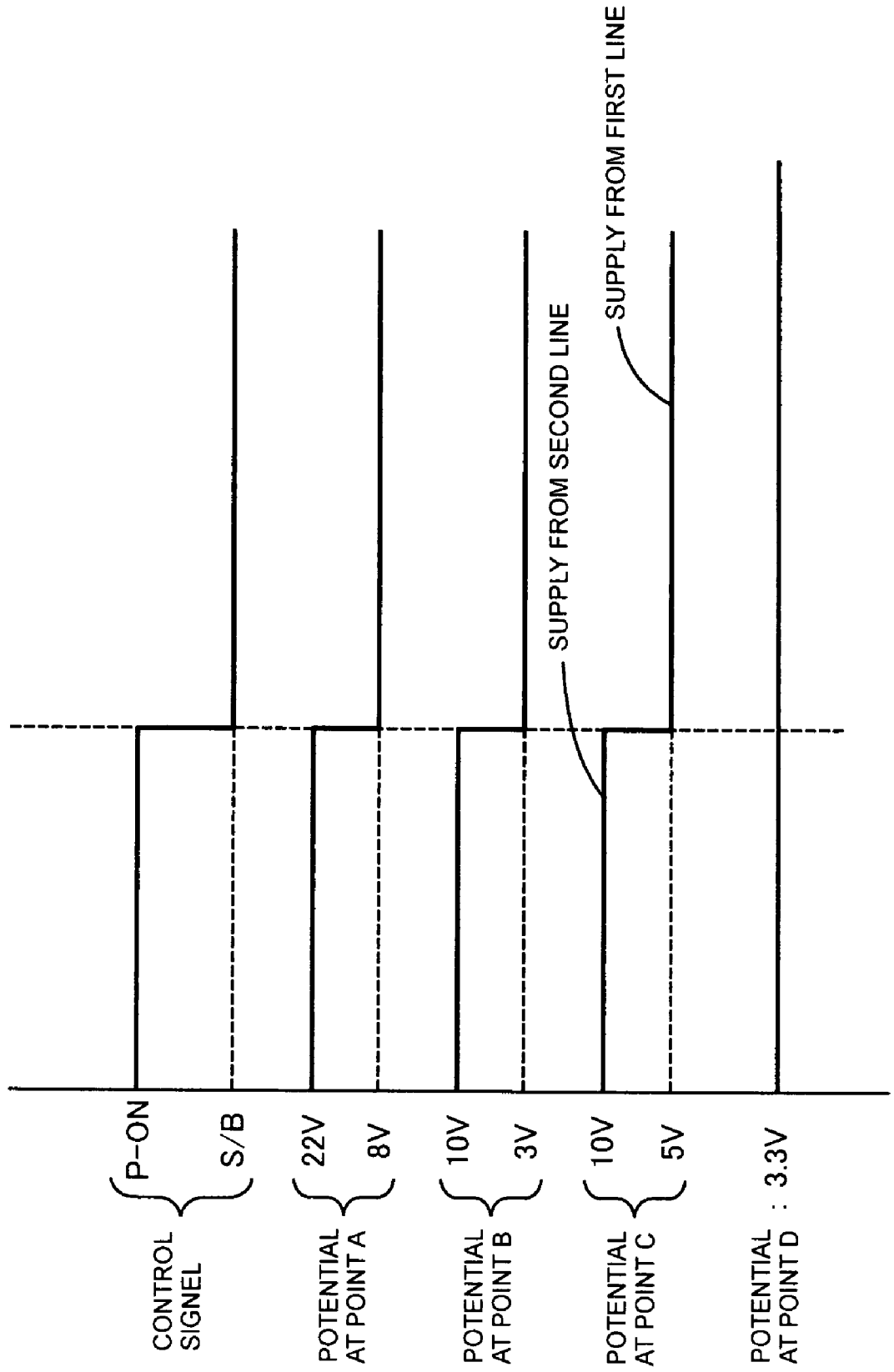
FIG. 3 is a timing chart showing the potential changes at various points in the voltage supply stabilizing circuit in association with power-on/standby.
Figure 4:
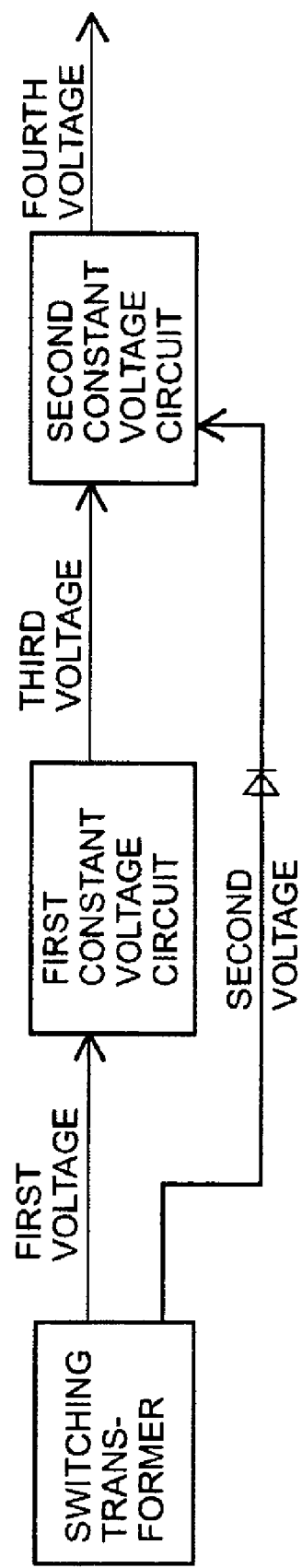
FIG. 4 is a diagram illustrating the claims.

Embodiments of the present invention will be described below in the following order:
(1) Configuration of an LCD television
(2) Configuration and operation of a voltage supply stabilizing circuit
(3) Summary
   (1) Configuration of an LCD Television:
   With reference to FIGS. 1 through 3, a voltage supply stabilizing circuit 20 of the present invention is described below taking an LCD television that is implemented using this circuit as an example. FIG. 1 is a block diagram illustrating the configuration (schematic configuration) of an LCD television 10, FIG. 2 is a circuit diagram showing the voltage supply stabilizing circuit 20 to be output from a switching transformer 14 in a power supply circuit 10*j* of the LCD television 10, FIG. 3 is a timing chart showing voltage changes at various points in the voltage supply stabilizing circuit 20 in association with power-on/standby. Although this embodiment is an example wherein the voltage supply stabilizing circuit 20 is applied at the stage before an inverter circuit 10*f* of the LCD television 10, it is possible to apply the same for power supply to a tuner or other circuits, and of course to any electrical and electronic devices requiring stable power supply, including the LCD television 10.

In FIG. 1, the LCD television 10 is composed of a microcomputer 10*h*, a tuner 10*a* that extracts and outputs a television broadcast signal for a selected channel from the television broadcast signals received by an antenna, a video processing unit 10*d* that displays on an LCD panel 10*e* a picture based on the television broadcast signal outputted from the tuner 10*a*, an audio processing unit 10*b* that outputs from a speaker 10*c* a sound based on the television broadcast signal outputted from the tuner 10*a*, a remote control signal receiving unit 10*i* that receives an operation command sent from a remote control 12 and outputs a control command (voltage signal) corresponding to the operation command to the microcomputer 10*h*, a power supply circuit 10*j* that supplies voltages to various parts of the LCD television 10, a backlight 10*g* that illuminates light from behind the LCD panel 10*e*, and an inverter circuit 10*f* that supplies power to the backlight 10*g*.

In the above configuration, the microcomputer 10*h* controls the various parts of the LCD television 10 by outputting control signals such as a P-ON-H signal (a signal to control the power-on/standby of the LCD television 10) according to control commands (voltage signals) received from the remote control signal receiving unit 10*i*.

Also, an external commercial power (for example, 100V AC) is supplied to the power supply circuit 10*j*, and the supplied voltage is converted to various voltages and supplied as operating power to various parts of the LCD television 10. Particularly, to the inverter circuit 10*f*, power supply voltage from the power supply circuit 10*j* is supplied through the voltage supply stabilizing circuit 20 described later.

(2) Configuration and Operation of the Voltage Supply Stabilizing Circuit:

FIG. 2 shows a circuit portion where the output of the switching transformer 14 in the power supply circuit is input to the voltage supply stabilizing circuit 20 and the voltage stabilized by the voltage supply stabilizing circuit 20 is output. Before the switching transformer 14 of the power supply circuit 10*j*, a rectifier circuit that rectifies an input AC voltage, a control unit that PWM-controls a voltage to be input to the switching transformer 14 based on a fed-backed voltage at an output terminal Out1, and the like are provided. The description below and the voltage to be output from an output terminal of the switching transformer 14 shown in FIG. 2 are rough indication and fluctuate depending on the operation. Specifically, although the figure shows a voltage at point B is 10V/3V (power-on/standby), it is also possible to be 8V/3V Also, as long as the magnitude relation among voltages is the same, different values may be given. In the description below, the outputs of the switching transformer and the input and output voltages of each regulator are shown as fixed values, but these values are rough standards and therefore fluctuate depending on the operating conditions such as temperature, current, or circuit elements to be used.

The switching transformer 14 has at least a first voltage (22V at power-on and 8V during standby in FIG. 2) to be used for feedback control of the switching transformer 14, and terminals (output terminals Out1 and Out2 in FIG. 2) that respectively output a second voltage (5V in FIG. 2) that is lower than the first voltage.

Also, the voltage supply stabilizing circuit 20 has at least a first constant voltage circuit (regulator IC1 in FIG. 2) that lowers the first voltage (22V at power-on and 8V during standby in FIG. 2) outputted from the output terminal Out1 of the switching transformer 14 to a third voltage (5V in FIG. 2), and a second constant voltage circuit to which either of the second voltage (10V at power-on and 3V during standby in FIG. 2) outputted from the output terminal Out2 of the switching transformer 14 and the third voltage and from which a fourth voltage (3.3V in FIG. 2) is output.

The voltage supply stabilizing circuit at least lowers the first voltage (22V at power-on and 8V during standby) to the third voltage (5V in FIG. 2) that is lower than the second voltage (10V at power-on and 3V during standby in FIG. 2) by the first constant voltage circuit (regulator IC1 in FIG. 2), inputs the third voltage to the second constant voltage circuit (regulator IC2 in FIG. 2), inputs the second voltage to the second constant voltage circuit as with the third voltage through a backflow prevention diode D3, and normally (at power-on in this embodiment) the second voltage (here 10V) is lowered to the fourth voltage (here 3.3V) that is lower than the third voltage (here 5V) by the second constant voltage circuit and supplied to a target device (here the inverter circuit 10*f*) and if an output of the second voltage falls below the third voltage (when the second voltage becomes 3V during standby, in this embodiment), the third voltage (here 5V) is lowered to the fourth voltage (here 3.3V) by the second constant voltage circuit (the regulator IC2 in FIG. 2) and supplied to a target device.

Specifically, the voltage supply stabilizing circuit 20 is mainly composed of backflow prevention diodes D1, D2, D3, D4 and regulators IC1 and IC2. The output terminal Out1 (first output terminal) of the switching transformer 14 and the regulator IC1 (first regulator) are forward-connected through the diode D1 (first diode), and the output of the regulator IC1 and the regulator IC2 (second regulator) are forward-connected through the diode D2 (second diode). The output of the regulator IC2 is input to the inverter circuit 10*f*.

Also, the output terminal Out2 (second output terminal) of the switching transformer 14 and the regulator IC2 are series- and forward-connected through the diodes D4 (fourth diode) and D3 (third diode) in this order. An anode of the diode D3 has a power supply line to the audio processing unit 10*b*.

The regulators IC1 and IC2 has each an in terminal to which a voltage is input, an out terminal from which a voltage is output, and a GND terminal (COM terminal) to be connected to the ground. The regulator IC1 produces an input of 5V or higher (first voltage, 22V at power-on and 8V during standby in FIG. 2) through the in terminal, and produces an output of 5V (third voltage) from the out terminal. Two diodes are series-connected between the GND terminal and the ground. The regulator IC2 produces an input of 3.3V or higher (10V, a second voltage, at power-on and 5V, a third voltage, during standby in FIG. 2) through the in terminal, and produces an output of 3.3V (fourth voltage) from the out terminal. A resistor is connected between the COM terminal (GND terminal) and the ground and also the in terminal and the out terminal are connected by a resistor.

In the above configuration, an output of the output terminal Out1 is input to the regulator IC1 through the diode D1, an output of the regulator IC1 is input to the regulator IC2 through the diode D2. Also, an output of the output terminal Out2 is input to the IC2 through the diodes D4 and D3. At the same time, an output of the output terminal Out 2 is supplied to the audio processing unit 10*b* through the diode D4. That is, since a voltage is supplied to the regulator IC2 from the output terminals Out1 and Out 2 via point C, it can be said that the voltage to be input to the regulator IC2 is the higher voltage of the output of the regulator IC1 and the output of the output terminal Out 2. Then, the regulator IC2 supplies the output to the inverter circuit 10*f* based on the inputted higher voltage.

Now, the operation of this embodiment configured as above is described with reference to the timing chart of FIG. 3. The points A, B, C, D in FIG. 3 correspond to the A, B, C, D in FIG. 2 respectively.

When the user press the power button of a remote control while viewing the LCD television 10, a remote control signal corresponding to this operation is transmitted and received by the remote control signal receiving unit. Then, a control command is output from the remote control signal receiving unit to the microcomputer 10*h*. The microcomputer 10*h* outputs a control signal P-ON (power on) to the power supply circuit 10*j* when the LCD television 10 is turned on, but starts to output a control signal S/B (standby) when a control command is received from the remote control signal receiving unit.

While the control signal P-ON is input to the power supply circuit 10*j*, an output of 22V is produced from the output terminal Out1 and an output of 10V is produced from the output terminal Out2. At this time, the potentials at points A, B, C, D in FIG. 2 become 22V, 10V, 10V, 3.3V respectively. That is, no current flows from the output terminal Out1 to point C and a current flows from the output terminal Out2 to the input terminal of the regulator IC2 via point C. Therefore, the voltage from the output terminal Out2 is supplied to point C through the diodes D4 and D3, and no current flows from the output terminal Out1 to point C. As a result, no current flows also to the regulator IC1 and no heat is generated from the regulator IC1.

On the other hand, when the control signal S/B is input to the power supply circuit 10*j*, an output of 8V is produced from the output terminal Out1 and an output of 3V is produced from the output terminal Out2. At this time, the potentials at points A, B, C, D in FIG. 2 become 8V, 3V, 5V, 3.3V respectively. That is, no current flows from the output terminal Out2 to point C and a current lowered by the regulator IC1 flows from the output terminal Out 1 to point C. Here, although the potential is lower at terminal Out2 than at a point C, no current flows from point C to the output terminal Out2 due to the rectification by the diode D3 and a current flows from point C to the input terminal of the regulator IC2. As a result, a current flows to the regulator IC1 and generates heat, but the amount of generate heat is small due to a low supply voltage (compared with that at P-ON) and therefore allows stable voltage supply.

This makes it possible to supply a voltage at a certain level (fourth voltage, 3.3V in FIG. 2) or higher to the regulator IC both at P-ON and at S/B. Accordingly, without requiring intentional switching between power supply sources using a switching circuit or the like, power supply sources are switched without delay (i.e., seamlessly) when P-ON is switched to S/B and vice versa and a certain level or higher voltage is supplied to the regulator IC2, thus causing no problem (such as the backlight going out, in this embodiment) with a target device (the inverter circuit, in this embodiment).

(3) Summary:

In other words, the switching transformer 14 has a terminal to produce an output of 22V at power-on and an output of 8V during standby and a terminal to produce an output of 10V at power-on and an output of 3V during standby, wherein, the output of 22V or 8V is lowered to 5V by the regulator IC1 and applied (input) to the regulator IC2, an input of 10V or 3V is produced at the regulator IC2, the input of 10V is lowered to a 3.3V by the regulator IC2 at power-on and supplied to the inverter circuit 10*f*, and 8V is lowered to 3.3V by the regulator IC and supplied to the inverter circuit 10*f*. This makes it possible to provide the voltage supply stabilizing circuit 20 for the inverter circuit of the LCD television that requires no control from the microcomputer 10*h* and can avoid drops in power supply and heat generation and thereby reduce the manufacturing cost.

As described above, according to the voltage supply stabilizing circuit of this embodiment, in the voltage supply stabilizing circuit that stably supplies a voltage outputted from the switching transformer, the switching transformer has at least terminals that respectively output the first voltage and the second voltage that is lower than the first voltage, the first voltage is lowered to the third voltage that is lower than the second voltage and input to the second constant voltage circuit, the second voltage is input to the second constant voltage circuit as with the third voltage through a backflow prevention diode, normally the second voltage is lowered by the second constant voltage circuit to the fourth voltage that is lower than the third voltage and supplied to a target device, and when the output of the second voltage drops below the third voltage the third voltage is lowered to the fourth voltage by the second constant voltage circuit and supplied to a target device.

That is, the first voltage outputted from the switching transformer is lowered to the third voltage by the first constant voltage circuit and input to the second constant voltage circuit, and likewise the second voltage outputted from the switching transformer is input to the second constant voltage circuit and the higher of the third and second voltages is input to the second constant voltage circuit. Then, the second constant voltage circuit raises the inputted voltage to the fourth voltage and supplies it to a target device.

This configuration is preferable when the output of the switching transformer drops. Specifically, although the normal relationship of the voltages is first voltage>second voltage>third voltage>fourth voltage, it may become first voltage>third voltage>second voltage>fourth voltage when the output of the switching transformer drops. This occurs in a transient state after the output of the switching transformer is changed, when power supply to the power supply circuit is unstable, or when the entire output of the switching transformer is reduced due to power saving. In such a case, conventionally it was necessary to switch the voltages to be input to the second constant voltage circuit by means of a switching circuit, but in the configuration of this embodiment power supply sources are switched automatically and without delay (seamlessly) without having to switch between power sources and voltage supply to the second constant voltage circuit continues.

It is more preferable to apply the present invention to a configuration wherein the switching transformer is feedback-controlled based on the first voltage. In this configuration, since the second voltage is normally supplied to the second regulator IC, the terminal that supplies the first voltage of the switching transformer has no load and only the terminal that supplies the second voltage has a load. Therefore, if the entire output of the switching transformer is reduced, a drop in the output from the terminal that supplies the second voltage is larger than a drop in the output of the terminal that supplies the second voltage, which may cause the terminal for supplying the second voltage to be unable to supply sufficient voltage to the second constant voltage circuit temporarily. Therefore, normally supplying a voltage based on the second voltage that is lower than the first voltage to the inverter circuit, and using the first voltage higher than the second voltage only when the second voltage dropped temporarily will reduce the power consumption at normal time and also suppress the heat generation in the first constant voltage circuit at normal time.

Also, it is preferable to implement the configuration of one of or a combination of the first and second constant voltage circuits with the regulator IC. That is, if the first and second constant voltage circuits are realized with the regulator IC, the circuit configuration of the voltage supply stabilizing circuit is simplified and the circuit can be easily designed. Moreover, less area on the substrate is required for disposing circuit elements, which will contribute to the miniaturization of electrical and electronic devices that use the voltage supply stabilizing circuit of the present invention.

Based on the above configuration, according to the voltage supply stabilizing circuit for the inverter circuit of the present invention, in the voltage supply stabilizing circuit for the inverter circuit that stabilizes voltage supply to the inverter circuit of the LCD apparatus, a voltage is supplied to the voltage supply stabilizing circuit from the first output terminal and the second output terminal of the switching transformer contained in the power supply circuit, the first output terminal is connected to the input terminal of the first regulator IC through the first diode that is forward-connected, the output terminal of the first regulator IC is connected to the input terminal of the second regulator IC through the second diode that is forward-connected, the second output terminal is connected to the input terminal of the second regulator IC through the third and fourth diodes that are series-forward-connected, from the first output terminal the first voltage is output that is used for feedback-control of the switching transformer, from the second output terminal the second voltage is output that is lower than the first voltage, the first regulator IC lowers the first voltage to the third voltage that is lower that the second voltage and inputs it to the second regulator IC, from the second output terminal the second voltage is input to the second regulator IC through a backflow prevention diode, at power-on of the LCD apparatus the second voltage is input to the second regulator IC, the second voltage is lowered to the fourth voltage that is lower than the third voltage and supplied to the inverter circuit, and during standby of the LCD apparatus, when a voltage to be supplied from the first and second output terminals drops below the voltage at power-on, the third voltage is input to the second regulator IC, lowered to the fourth voltage that is lower than the third voltage, and supplied to the inverter circuit.

It is needless to say that the present invention is not limited to the embodiments described above, and for those skilled in the art the following are to be disclosed as embodiments of the present invention:

Appropriately modified combination of mutually replaceable members, configurations, or the like which are disclosed in the above embodiments;

Appropriately replaced or modified combination of members and configurations which are mutually replaceable with the members and configurations that are not disclosed in the above embodiment but are known arts; and Appropriately replaced or modified combination of members and configurations which can be assumed to be substitutions for the members and configuration that are not disclosed in the above embodiments but are disclosed in the above embodiments by those skilled in the art based on the known arts or the like.

In addition, reference to "first," "second," "third," and etc. members throughout the disclosure (and in particular, claims) is not used to show a serial or numerical limitation but instead is used to distinguish or identify the various members of the group.

What is claimed is:

1. A circuit that stabilizes voltage supply to an inverter circuit of an LCD apparatus, comprising:

two stable modes of operations that include a power-ON mode of operation and a standby-STB mode of operation;

the circuit includes a switching transformer within a power supply circuit;

the switching transformer includes a first secondary winding and a second secondary winding that have respective first and second winding ratios;

the first secondary winding and the second secondary winding respectively include a first output terminal and a second output terminal, with the first output terminal and the second output terminal respectively outputting a first output voltage $V_{Out1}$ having a first output power-ON mode voltage $V_{out1\text{-}ON}$ and a first output standby-STB mode voltage $V_{out1\text{-}STB}$ and a second output voltage $V_{Out2}$ having a second output power-ON mode voltage $V_{out2\text{-}ON}$ and a second output standby-STB mode voltage $V_{out2\text{-}STB}$ in accordance with the first and second secondary winding ratio of the switching transformer and mode of operation such that the second output voltage value is lower than the first output voltage, and the first output voltage is used for feedback control of said switching transformer;

a first diode having an anode connected to the first output terminal;

a first regulator integrated circuit (IC) having an input terminal that is connected to a cathode of the first diode, forming a first junction, with the first junction having a first power-ON mode voltage $V_{1\text{-}ON}$ and a first standby-STB voltage $V_{1\text{-}STB}$ for respective power-ON and standby-STB mode of operations;

a second diode having an anode connected to an output terminal of the first regulator IC;

a second regulator integrated circuit (IC) having an input terminal that is connected to a cathode of the second diode, and having an output terminal coupled to the inverter circuit at a fourth power-ON mode voltage $V_{4\text{-}ON}$ and a fourth standby-STB voltage $V_{4\text{-}STB}$ for respective power-ON and standby-STB mode of operations;

a third diode having a cathode connected to the input terminal of the second regulator IC, forming a second junction, with the second junction having a third power-ON mode voltage $V_{3\text{-}ON}$ and a third standby-STB voltage $V_{3\text{-}STB}$ for respective power-ON and standby-STB mode of operations;

a fourth diode having an anode connected to the second output terminal and a cathode connected to an anode of the third diode, forming a third junction, with the third junction having a second power-ON mode voltage $V_{2\text{-}ON}$ and a second standby-STB voltage $V_{2\text{-}STB}$ for respective power-ON and standby-STB mode of operations;

with the secondary windings ratios set such that during stable modes of operations:

i.

$V_{Out1} > V_{Out2}$ ii.

a. $V_{1\text{-}ON} > V_{1\text{-}STB} > V_{3\text{-}ON}$ and $V_{3\text{-}STB} > V_{4\text{-}ON}$ and $V_{4\text{-}STB}$, and b. $V_{1\text{-}ON} > V_{2\text{-}ON}$, and c. $V_{1\text{-}STB} < V_{2\text{-}ON}$ iii.

$V_{2\text{-}ON} > V_{2\text{-}STB}$ iv.

$V_{2\text{-}ON} > V_{3\text{-}ON}$ and $V_{3\text{-}STB} > V_{4\text{-}ON}$ and $V_{4\text{-}STB}$ v.

a. $V_{3\text{-}ON}$ and $V_{3\text{-}STB} > V_{2\text{-}STB}$, and b. $V_{4\text{-}ON}$ and $V_{4\text{-}STB} > V_{2\text{-}STB}$.

2. A circuit that supplies a voltage outputted from a switching transformer to a target device, comprising:

the switching transformer including a first terminal and a second terminal that respectively output a first output voltage $V_{Out1}$ and a second output voltage $V_{Out2}$ with the second output voltage $V_{Out2}$ lower than the first output voltage $V_{Out1}$;

a first constant voltage circuit coupled with the first terminal for receiving the first output voltage $V_{Out1}$ and outputting a third voltage $V_3$ that is lower than the first output voltage $V_{Out1}$;

a diode having an anode coupled with the second terminal for receiving the second output voltage $V_{Out2}$, and a cathode coupled with an output of the first constant voltage circuit and an input of a second constant voltage circuit, with an output of the second constant voltage circuit generating and supplying a fourth voltage $V_4$ to the target device;

with the fourth voltage $V_4$ generated lower than the third voltage by one of:

reducing the second output voltage $V_{Out2}$ if $V_{Out2}>V_3$ and reducing the third voltage if $V_{Out2}<V_3$.

3. The circuit according to claim 2, wherein said switching transformer is feedback-controlled based on said first voltage.

4. The circuit according to claim 2, wherein said first constant voltage circuit is a regulator integrated circuit (IC).

5. The circuit according to claim 2, wherein said second constant voltage circuit is a regulator integrated circuit (IC).

* * * * *